US012026899B2

(12) United States Patent
Vignard et al.

(10) Patent No.: US 12,026,899 B2
(45) Date of Patent: Jul. 2, 2024

(54) DEPTH MAPS PREDICTION SYSTEM AND TRAINING METHOD FOR SUCH A SYSTEM (71) Applicants: TOYOTA MOTOR EUROPE, Brussels (BE); ETH ZURICH, Zurich (CH)

(72) Inventors: Nicolas Vignard, Brussels (BE); Dengxin Dai, Zurich (CH); Vaishakh Patil, Zurich (CH); Luc Van Gool, Zurich (CH)

(73) Assignees: TOYOTA MOTOR EUROPE, Brussels (BE); ETH ZURICH, Zurich (CH)

( * ) Notice: Subject to any disclaimer, the term of this patent is extended or adjusted under 35 U.S.C. 154(b) by 357 days.

(21) Appl. No.: 17/597,752

(22) PCT Filed: Jul. 22, 2019

(86) PCT No.: PCT/EP2019/069710
§ 371 (c)(1),
(2) Date: Jan. 21, 2022

(87) PCT Pub. No.: WO2021/013334
PCT Pub. Date: Jan. 28, 2021

(65) Prior Publication Data
US 2022/0262023 A1  Aug. 18, 2022

(51) Int. Cl.
*G06T 7/50* (2017.01)
*G06T 3/4046* (2024.01)
(Continued)

(52) U.S. Cl.
CPC .............. *G06T 7/50* (2017.01); *G06T 3/4046* (2013.01); *G06T 7/55* (2017.01); *G06V 10/454* (2022.01);
(Continued)

(58) Field of Classification Search
CPC .......... G06T 7/50; G06T 3/4046; G06T 7/55; G06T 2207/20081; G06T 2207/20084;
(Continued)

(56) References Cited

U.S. PATENT DOCUMENTS

2020/0302629 A1*  9/2020  Jie ........................... G06N 3/048
2020/0342253 A1* 10/2020  Li ........................... G06V 10/82
2021/0019949 A1*  1/2021  Ulbricht .................... G06T 7/50

FOREIGN PATENT DOCUMENTS

WO     2018052875 A1    3/2018

OTHER PUBLICATIONS

John Luke Chuter et al., "U-N.o.1T: A U-Net exploration, in Depth," Dec. 18, 2018 (Dec. 18, 2018), Retrieved from the Internet: URL:https://pdfs.semanticscholar.org/764e/5baf79b27b10b2e15452057424757b83ab75.pdf?_ga=2.131699983.1271033034.1578489688-95250 084.1568820998.
(Continued)

*Primary Examiner* — Christopher M Brandt
(74) *Attorney, Agent, or Firm* — Dickinson Wright, PLLC (57) ABSTRACT

A depth maps prediction system comprising a neural network (1000) configured to receive images (I) of a scene at successive time steps (t−1, t, t+1, . . . ) and comprising three sub-networks: an encoder (100), a ConvLSTM (200) and a decoder (300).
The neural network (1000) is configured so that at each time step:
a) the encoder sub-network (100) processes an image (I) and outputs a low resolution initial image representation (X);
b) the CONVLSTM sub-network (200) processes the initial image representation (X), values for a previous time step (t−1) of an internal state (C(t−1)) and of an LSTM hidden variable data (H(t−1)) of the ConvLSTM sub-network, and outputs updated values of the internal state (C(t)) and of the LSTM hidden variable data (H(t)); and
(Continued)

c) the decoder sub-network (300) inputs the LSTM output data (LOD) and generates a predicted dense depth map (D") for the inputted image (I).

15 Claims, 3 Drawing Sheets

(51) Int. Cl.
    *G06T 7/55*         (2017.01)
    *G06V 10/44*      (2022.01)
    *G06V 10/82*      (2022.01)
    *G06V 20/64*      (2022.01)

(52) U.S. Cl.
    CPC .............. *G06V 10/82* (2022.01); *G06V 20/64* (2022.01); *G06T 2207/20081* (2013.01); *G06T 2207/20084* (2013.01); *G06T 2207/30252* (2013.01)

(58) Field of Classification Search
    CPC . G06T 2207/30252; G06T 2207/10016; G06T 2207/10028; G06V 10/454; G06V 10/82; G06V 20/64; G06N 3/044; G06N 3/045; G06N 3/08
    See application file for complete search history.

(56) References Cited

OTHER PUBLICATIONS

Kumar Aran CS et al., "DepthNet: A Recurrent Neural Network Architecture for Monocular Depth Prediction," 2018 IEEE/CVF Conference on Computer Vision and Pattern Recognition Workshops (CVPRW). IEEE, Jun. 18, 2018 (Jun. 18, 2018), pp. 396-3968, XP033475663, DOI: 10.1109/CVPRW.2018.00066.

Fangchang MA et al., "Self-Supervised Sparse-to-Dense: Self-Supervised Depth Completion from LiDAR and Monocular Camera," Later in: 2019 International Conference on Robotics and Automation (ICRA), Jul. 3, 2018 (Jul. 3, 2018), XP055655795, Retrieved from the Internet: URL:https://arxiv.org/abs/1807.00275.

* cited by examiner

DEPTH MAPS PREDICTION SYSTEM AND TRAINING METHOD FOR SUCH A SYSTEM

This application is a 371 of International Application No. PCT/EP2019/069710, filed Jul. 22, 2019, including the specification, drawings and abstract, the entire disclosure of which is incorporated herein by reference.

TECHNICAL FIELD

The present disclosure is directed to a depth maps prediction system for providing dense depth maps of a scene, in particular a scene surrounding a vehicle.

BACKGROUND ART

Automated driving systems are now being developed for partly or fully autonomous vehicles. To perform their function, such systems must generally be able to acquire dense depth maps (or dense 3D-maps) of the surroundings of the vehicle.

Various 3D-scanners have been developed in this purpose, in particular lidars. However, high resolution lidars are very expensive.

An alternative is to use a pair of cameras, coupled and calibrated so as to perform stereovision. However, the output of such paired cameras sometimes lacks reliability, or accuracy, in some environments. Consequently, there is a need for a a depth maps acquisition system capable of providing a 3D-map of a scene, in particular a dense (or high resolution) depth map of the scene, with good to high accuracy, at a reasonable cost.

Neural networks comprising an encoder and a decoder sub-networks connected in series have been developed to output such dense depth maps of a scene, based on a (single) image acquired by a camera. Such a system is presented for instance in publication [16] referenced below. More recently, neural networks comprising an encoder sub-network, an LSTM network and a decoder sub-network, connected in series have been proposed (see for instance document WO2018/052875). Thanks to the LSTM network, these networks can predict dense depth maps based on a series of successive images. Consequently, compared with systems in which the depth map is based only on a single image, these networks exhibit improved accuracy, since their output is based on a series of successive images. However, the accuracy and the reliability of the depth values outputted by such networks remain limited.

Other approaches for obtaining dense depth maps on the basis of images or of sparse depth maps, and/or other technologies, are proposed by the documents referenced below. For instance, publication [11] referenced below proposes to use the information of an image with a sparse depth map in order to predict a dense depth map of the scene. However this document like the other documents cited hereafter, fails to propose a method having satisfactory accuracy.

REFERENCES

[1] Z. Chen, V. Badrinarayanan, G. Drozdov, and A. Rabinovich. "Estimating depth from rgb and sparse sensing". In ECCV, 2018.

[2] X. Cheng, P. Wang, and R. Yang. "Depth estimation via affinity learned with convolutional spatial propagation network". In ECCV, 2018.

[3] D. Eigen and R. Fergus. "Predicting depth, surface normal and semantic labels with a common multi-scale convolutional architecture". In ICCV, 2015.

[4] D. Eigen, C. Puhrsch, and R. Fergus. "Depth map prediction from a single image using a multi-scale deep network". In NIPS, 2014.

[5] H. Fu, M. Gong, C. Wang, K. Batmanghelich, and D. Tao. "Deep Ordinal Regression Network for Monocular Depth Estimation". In CVPR), 2018.

[6] R. Garg, B. V. Kumar, G. Carneiro, and I. Reid. "Unsupervised cnn for single view depth estimation: Geometry to the rescue". In ECCV, 2016.

[7] K. He, X. Zhang, S. Ren, and J. Sun. "Deep residual learning for image recognition", in CVPR 2016.

[8] M. Jaritz, R. De Charette, E. Wirbel, X. Perrotton, and F. Nashashibi. Sparse and dense data with cnns: "Depth completion and semantic segmentation". In 3DV, 2018.

[9] I. Laina, C. Rupprecht, V. Belagiannis, F. Tombari, and N. Navab. "Deeper depth prediction with fully convolutional residual networks". In 3DV, 2016.

[10] F. Ma, G. V. Cavalheiro, and S. Karaman. "Self-supervised sparse-to-dense: Self-supervised depth completion from lidar and monocular camera". ICRA, 2019.

[11] F. Ma and S. Karaman: "Sparse-to-dense: Depth prediction from sparse depth samples and a single image", in ICRA 2018

[12] J. Uhrig, N. Schneider, L. Schneider, U. Franke, T. Brox, and A. Geiger. "Sparsity invariant cnns". In 3DV, 2017.

[13] C. Wang, J. Miguel Buenaposada, R. Zhu, and S. Lucey. "Learning depth from monocular videos using direct methods". In CVPR, 2018.

[14] S. Xingjian, Z. Chen, H. Wang, D. Y. Yeung, W. K. Wong and W. C. Woo: "Convolutional LSTM network: A machine learning approach for precipitation nowcasting", in NIPS 2015.

[15] Z. Yin and J. Shi. Geonet: "Unsupervised learning of dense depth, optical flow and camera pose". In CVPR, 2018.

[16] T. Zhou, M. Brown, N. Snavely, and D. G. Lowe. "Unsupervised learning of depth and ego-motion from video". In CVPR, 2017.

[17]: Olaf Ronneberger, Philipp Fischer, Thomas Brox. "U-net: Convolutional Networks for Biomedical Image Segmentation", Medical Image Computing and Computer-Assisted Intervention (MICCAI), Springer, LNCS, Vol. 9351: 234-241, 2015].

DISCLOSURE OF THE INVENTION

Accordingly, a purpose of the present disclosure is to propose a depth maps prediction system capable of outputting dense depth maps based on images (acquired by a camera), and which has an improved accuracy as compared to the existing systems presented above.

To meet this purpose, according to the present disclosure a depth maps prediction system is proposed.

This depth maps prediction system comprises a neural network implemented by one or more computers.

This neural network is configured to sequentially receive images representing a scene at successive time steps;

the neural network comprises an encoder sub-network, a ConvLSTM sub-network and a decoder sub-network, connected in series.

The neural network is configured so that at each time step among a plurality of sparse depth map acquisition time steps, successively:

a) the encoder sub-network inputs and processes an image and a sparse depth map of the scene associated with the inputted image, the sparse depth map comprising depth information for a subset of pixels of the inputted image, and outputs an initial image representation whose resolution is less than the resolution of the inputted image;

b) the ConvLSTM sub-network inputs and processes the initial image representation, and values for a previous time step of an internal state and of an LSTM hidden variable data of the ConvLSTM sub-network, and outputs updated values for the time step of the internal state and the LSTM hidden variable data of the ConvLSTM sub-network;

c) the decoder sub-network inputs the outputted LSTM hidden variable data and generates a predicted dense depth map for the inputted image.

Usually, fully connected LSTM networks (or FC-LSTM networks) have long been considered the state-of-the-art solution to make predictions taking into account time series of data. However in such networks, due to the number of connections, the number of parameters is very high.

By contrast, as mentioned above, the neural network of the depth maps prediction system comprises a ConvLSTM network.

A ConvLSTM network is a type of LSTM (Long-Short Term Memory) recurrent neural network which has been proposed and defined by publication [14] (cited above).

Advantageously in such networks, the number of parameters is much lower than in a FC-LSTM network. Indeed, it contains less redundancy for spatial data than a FC-LSTM network. In addition, a ConvLSTM has convolutional structures in both the input-to-state and state-to-state transitions, and a has strong representational power which makes it suitable for giving predictions in complex dynamical systems.

As it appears in publication [14], ConvLSTM networks have been developed to improve precipitation forecasting. However, it has been found that such ConvLSTM networks, according to the present disclosure, can also be efficiently used to calculate dense depth maps information.

Indeed, a ConvLSTM network is quite efficient for keeping memory of previously received data, for instance images. At each time step, in addition to the initial image representation X(t) related to the inputted image I(t), the ConvLSTM sub-network receives a value of a cell state or internal state (C(t−1)) of the ConvLSTM sub-network at a previous step, and a value of an LSTM hidden variable data or state (H(t−1)) of the ConvLSTM sub-network at the previous step. These values are then used to calculate the updated values for time t of the internal state (C(t)) and the LSTM hidden variable data (H(t)) of the ConvLSTM sub-network.

Thanks to this property, the depth maps predicted by the neural network exhibit a high accuracy.

With the architecture proposed above, the number of parameters remains reasonable. In particular, the encoder-decoder architecture of the neural network makes it possible to adapt the resolution of the data processed by the different blocks of the neural network and therefore, to optimize the processing of the information. In this purpose, the encoder outputs an initial image representation (noted X), to be inputted into the ConvLSTM sub-network, which usually has a much lower resolution (height-width resolution) than the initial images. Consequently, since the initial image representation (X) outputted by the encoder has a low resolution, i.e. its high information density, the ConvLSTM neural network can be used efficiently and its size can be optimized.

After the ConvLSTM sub-network has processed the data outputted by the encoder sub-network, it outputs a LSTM hidden variable data which is processed by the decoder so as to increase the resolution of the data, in order to obtain ultimately a dense depth map having (usually) a resolution similar to that of the initial image of the scene.

The ConvLSTM sub-network is preferably configured to input inputs, to output outputs and to have hidden states, said inputs, outputs and hidden states all being 3D tensors having two dimensions which are spatial dimensions (that is, the width and height dimensions of the images).

The images and/or the sparse depth maps acquired by the neural network can be provided directly to the neural network, or can undergo a pre-processing (for instance, regarding the images, to enhance contrast, normalize some features of the image, etc.). Part of the pre-processing can be performed by the neural network.

For instance, in an embodiment the encoder sub-network comprises an image convolutional block configured to input the inputted image and to apply a convolution thereto.

The output of the image convolutional block is then transmitted to the following blocks of the encoder sub-network; usually, to the most upstream one of down-sampling convolutional blocks of the encoder sub-network.

The above-defined system outputs dense depth maps based on series of successive images. In most cases, these images are images outputted by a camera. However, other devices could be used for producing these images.

Now, in all embodiments the images inputted by the neural network should show the scene as seen by one (a single) observer, so that there is a continuity in the pose of the observer relative to the scene shown by the successive images.

While the above-defined system can be operated during part of the time steps based only on images (as an input), during the sparse depth map acquisition time steps, a sparse depth map is also inputted to the system in order to increase the accuracy of the outputted dense depth maps.

Indeed, it has appeared that the accuracy of the neural network is significantly improved when in addition to images, the neural network is also fed with sparse depth maps.

The sparse depth maps are matrix-like data, usually having the same height and width resolution as the images, and which comprise depth information only for a subset of the pixels. In each depth map, each depth information which is at a (x,y) location in the matrix represents a distance between the camera and a point of the scene which is in the solid angle associated with the position (x,y).

The subset can be relatively very small, comprising for instance less than $1/10^{th}$ of the total number of pixels, or even less than $1/50^{th}$ of the total number of pixels.

The positions of the sparse depth map where distance or depth information is not available may be set to 0.

By contrast, dense depth maps are depth maps which comprise depth information for all or almost all pixels of the map.

The sparse depth maps can be acquired by low resolution lidars, at a much lower cost than using a high resolution lidar. Consequently, the total cost of the above-proposed system remains much lower than that of an acquisition system comprising a high-resolution 3D-scanner.

In a sparse depth map, the locations of the data points where depth information is available may be random. In an embodiment, the locations of the data points are determined by the 3D-scanner used. For instance, if the 3D-scanner is a lidar configured to acquire four lines of data at each time step, the sparse depth map can comprise depth information only for four lines of data points.

Like the images to be inputted to the neural network, the sparse depth maps can undergo a pre-processing. The pre-processing can also be performed (or part of it) by the neural network.

Accordingly, in an embodiment the encoder sub-network further comprises a sparse depth map convolutional block configured to input the sparse depth map and to apply a convolution thereto.

The output of the sparse depth map convolutional block is then transmitted to the following blocks of the encoder sub-network; usually, to the most upstream one of down-sampling convolutional blocks of the encoder sub-network.

In an embodiment, the sparse depth map has the same resolution as the inputted image;
at step a), data based on the inputted image and data based on the sparse depth data are concatenated to obtain combined scene data; and
the combined scene data is inputted, directly or indirectly, to a down-sampling convolutional block of the encoder sub-network, configured to reduce the resolution of data processed by the encoder sub-network. When the combined scene data is inputted indirectly to the down-sampling convolutional block, it means that the combined scene data undergoes some processing before being transmitted to the down-sampling convolutional block.

The 'concatenation' as defined here is an operation in which two data structures having the same height-width resolution, each comprising one or more values, called 'channels', for each line/column position, are bundled, thus forming a data structure having the same resolution as the initial data structures, but a number of channels equal to the sum of the numbers of channels of the initial data structures.

In an embodiment of the system, the neural network has an architecture of a UNet.

A U-Net architecture is the neural network architecture proposed and defined by publication [17].

A U-Net is a neural network comprising essentially a contracting path and an expansive path, which gives it the u-shaped architecture; the contracting path and the expansive path are embodiments of the encoder and decoder sub-networks of the present application.

The contracting path is a typical convolutional sub-network that consists of repeated application of convolutions, each followed by a rectified linear unit (ReLU) and a max pooling operation. During the contraction, the spatial information is reduced while feature information is increased. The expansive pathway combines the feature and spatial information through a sequence of up-convolutions and concatenations with high-resolution features from the contracting path.

U-Net is memory efficient and allows for applications on large images. It also lifts the limitation of resolution due to missing context by using high-resolution features from the contracting path.

Several structures can be adopted for the encoder sub-network. The encoder sub-network may for instance comprise a down-sampling convolutional block, or a plurality of down-sampling convolutional blocks connected in series, each down-sampling convolutional block being configured to reduce the resolution of data processed by the encoder sub-network.

For instance, each down-sampling convolutional block may comprise the following layers: a convolution layer, in particular configured to apply a convolution operation with receptive fields of 3×3; a Batch Normalisation layer; and a ReLU layer.

In an embodiment, the encoder sub-network includes a convolutional neural sub-network, for instance a ResNet, in particular a ResNet-34 (a ResNet-34 is a ResNet with 34 layers).

A Resnet and a ResNet-34 have been for instance proposed by publication [7].

A ResNet is a neural network specifically configured to learn an identity mapping during the training phase, by learning the residual of input and output of some layers (or sub-networks). The difference between a ResNet and a traditional neural network lies in that a traditional neural network will learn the output directly, while a ResNet instead models the layers to learn the residual of input and output of sub-networks. This will give the network an option to just skip sub-networks. In other words, the output of a particular subnetwork is just the output of the last subnetwork. This way, the depth of the network can be increased substantially without suffering too much from the problem of vanishing gradient and the curve of dimensionality.

In an embodiment, the decoder sub-network comprises:
at least one up-sampling convolutional block, connected in series, and configured to input the LSTM output data and to yield a raw dense depth map; and
a convolutional block configured to input the raw dense depth map, and to apply a convolution thereto to yield a full dense depth map.

In the definition above, the expression 'connected in series' of course only concerns the case where the decoder sub-networks comprises at least two up-sampling convolutional blocks.

Each up-sampling block is configured to apply a convolution to the processed data, and to unpool or up-sample the processed data so as to increase the spatial resolution of the processed data. Thanks to the successive up-sampling operations, the resolution of the data increases and ultimately, the decoder sub-network outputs a depth map of 'high' resolution, named herein the 'full dense depth map'.

If the resolution of the full dense depth map does not fit with the input requirements of other system(s) to which the dense depth map is outputted, a resolution adjustment may be necessary.

In this purpose, in some embodiments, the decoder sub-network comprises an interpolation block configured to input the full dense depth map and to apply a bilinear interpolation thereto to yield the predicted dense depth map. The interpolation block adapts the resolution of the outputted dense depth map so that it can be used more easily by other systems.

In an embodiment, when in the neural network, the encoder comprises said at least one down-sampling convolutional block and the decoder comprises said at least one up-sampling convolutional block, the neural network comprises skip connections, established between outputs of said at least one down-sampling convolutional block of the encoder and inputs of said at least one up-sampling convolutional block of the decoder. The skip connections increase indeed the accuracy of the neural network, in particular the accuracy of the predicted depth values at local scale.

Preferably, the encoder and the decoder comprise the same number of respectively the same number n of respectively down-sampling and up-sampling convolutional blocks. The encoder thus comprises a sequence of down-sampling convolutional blocks upstream the ConvLSTM network, and the decoder comprises a sequence of up-sampling convolutional blocks downstream the ConvLSTM network. The down-sampling convolutional blocks of the first sequence are associated with the up-sampling convolutional blocks of the second sequence, in reverse order (that is, for each rank y in the encoder (y=1 . . . n), the down-sampling block at rank y is associated with an up-sampling block at position n−y+1 of the decoder).

Preferably the skip connections are arranged so that each skip connections can transmit an output of a down-sampling convolutional block of the encoder to the associated up-sampling convolutional block of the decoder.

According to another aspect, the present disclosure is directed to one or more non-transitory computer storage medium encoded with instructions that, when executed by one or more computers, cause the one or more computers to implement the system as defined above.

Training

Advantageously, the neural network of the proposed system can be trained by end-to-end learning. Accordingly, in an embodiment the neural network is configured to be trained by end-to-end training, based on a training data set; the training data set comprising, for a plurality of time steps, an image, a sparse depth map and dense depth map. The dense depth maps constitute the ground truth information.

The dense depth map is normally denser than the sparse depth map, but is not necessarily a dense map; in practice a sparse depth map is often used.

The loss function of the neural network can take up different forms.

In an embodiment, the loss function comprises at least one term in a list comprising an L1 function, an L2 function, a Reverse Huber (or 'berHu') function, and a synthesis view function, wherein the berHu function is a function of differences, where a sparse depth data point is available, between the value of the sparse depth data point and the value of the estimated depth at the same location (x,y) in the image; and the synthesis view function is a function of differences between values of an image captured at a time step and values of a calculated image for the same time step, wherein the calculated image is calculated by applying an estimated relative camera pose between a previous time step (t−1) and the time step (t) to the image captured at the previous time step.

(Of course the images captured at the different time steps belong to the same video sequence, typically a sequence of images acquired by a single camera.)

That is, in this case the image captured at a previous time step (t−1) is synthesized (re-rendered) for the current time step (t) taking into account the relative camera pose and the estimated depth map. The synthesized image is then compared with the actually-captured image at time t; a pixel-wise loss function (or term), e.g. L2, can then be included in the loss function; this term is called the 'view-synthesis loss'. The assumption here is that if the depth map and camera pose are accurate, the (synthesized) re-rendered image should be similar to the actually captured image.

In the expression of the berHu loss function and the synthesis view loss function, the above-mentioned differences are usually summed for all values in the width and height directions of the data.

Preferably, the loss function is a combination, in particular a linear combination, of the berHu loss term and the view synthesis loss term.

The present disclosure is also directed to one or more non-transitory computer storage medium encoded with instructions that, when executed by one or more computers, cause the one or more computers to implement the above-defined method(s) for training the neural network.

BRIEF DESCRIPTION OF THE DRAWINGS

The present invention may be better understood and its numerous other objects and advantages will become apparent to those skilled in the art by reference to the accompanying drawing wherein like reference numerals refer to like elements in the several figures and in which.

DESCRIPTION OF PREFERRED EMBODIMENTS

Figure 1:
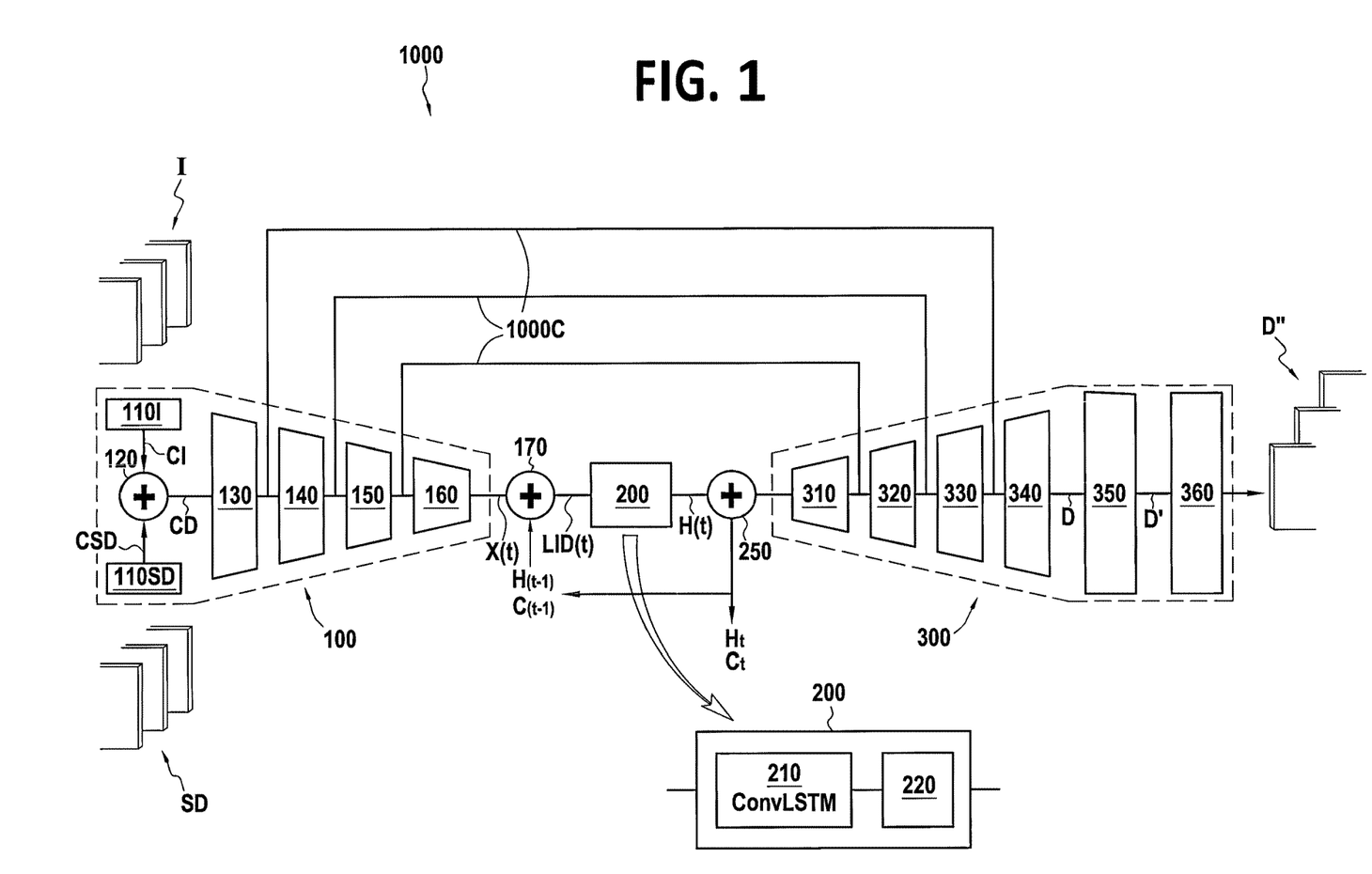
FIG. 1 is a schematic representation of an image depth prediction neural network according to the present disclosure.

A neural network 1000 according to the present disclosure will now be presented. Neural network 1000 has been designed to output or predict dense depth maps D'' of the environment of a camera, based on images I acquired by the camera. In the present exemplary embodiment, the images I have coordinates (x, y), with x varying from 1 to $H_{high}$ and y varying from 1 to $W_{high}$.

Specifically, in this embodiment neural network 1000 is designed to output the dense depth maps D'' further taking into account sparse depth maps SD. These sparse depth maps include depth information (z) for a subset of the pixels of an image I.

Accordingly, neural network 1000 realizes a function f: I×SD ☐ D''.

Neural network 1000 is able to output dense depth maps D'', which comprise depth predictions D''(x,y,t) for all pixels (x,y) of an inputted image I.

Architecture and Operation of Neural Network 1000

The neural network 1000 comprises an encoder sub-network 100, a pre-LSTM concatenation node 160, a ConvLSTM convolutional sub-network 200, a post-LSTM concatenation node 250 and a decoder sub-network 300, connected in series.

The architecture of the encoder 100 and of the decoder 300 is based on the architecture proposed by publication [11]. Therefore, unless specified otherwise, the architecture of these sub-networks can at least be the same as the architecture proposed by publication [11].

The encoder sub-network 100 (or encoder 100) comprises in parallel an image convolutional block 110I and a sparse depth map convolutional block 110SD; the outputs of these two blocks are inputted to an upstream concatenation node 120, which concatenates them and feeds the obtained combined data CD to the downstream part of encoder 100 (FIG. 1).

This downstream part of encoder 100 comprises four sub-networks 130, 140, 150 and 160 connected in series. Each of them forms a down-sampling block which reduces the resolution of the data it processes.

The decoder 300 comprises four sub-networks 310, 320, 330 and 340, a normalization sub-network 350 and a resizing sub-network 360.

In addition, long skip connections 1000C are established in neural network 1000 between the encoder 100 and decoder 300, as shown on FIG. 1, to produce fine detailed predictions.

These skip connections are used to enhance the resolution of the decoder's feature maps; this is done by the skip connections, which forward some subtle structural information from the high-resolution feature maps of the encoder to the decoder.

Each of sub-networks 130, 140, 150, 160, 310, 320, 330 and 340 is a convolutional neural network.

Each of these sub-networks is now going to be described, as well as the input, output and concatenation operations, in the same order in which data is processed by neural network 1000 during operation. The complete architecture of neural network 1000 is shown by FIG. 1.

The following notations are used hereinafter:
I(x,y,t) inputted image, whose depth map is to be determined
SD(x,y,t) sparse depth map
CD(x,y,t) combined scene data
GTD(x,y,t) ground truth depth map
X(x,y,t) initial image representation, outputted by encoder 100
LID LSTM input data, inputted by the ConvLSTM sub-network 200
H(x,yt,t) LSTM hidden variable data, outputted by the ConvLSTM sub-network 200
D(x,y,t) raw dense depth map
D'(x,y,t) full dense depth map
D"(x,y,t) predicted dense depth map In the following, for any data structure 'F' processed by the neural network (F can be for example any of the above data structures I, D, D', D", etc.), the notations F, F(t) and F(x,y,t) are used hereinafter interchangeably.

In such a data structure F, for each data point F(x,y,t), the first two arguments (x,y) indicate the location of the data point along the height and width dimensions.

The third argument of such a data structure is the time step (t)(an integer).

For each location (x,y), each data point F(x,y,t) comprises one or more variables called 'channels'; for instance, an RGB image I comprises three channels R,G,B (one byte each, in the present embodiment).

Each of the depth maps (D, D', D" and D'") has only one channel, depth (Z).

While I(x,y,t) is dense, D(x,y,t) has regions with missing values which are indicated by zero.

Encoder 100: Input Data Preparation and Concatenation

At each sparse depth map acquisition time step t, the data inputted by the neural network 1000 is based on the image I(t) and the corresponding sparse depth map SD(t).

More generally, the sparse depth map may be provided either at each time step, or for a part of the time steps (for instance, for one time step out of three, depending on the relative acquisition frequencies of the 3D-scanner used for sparse depth maps acquisition, and the camera). The time steps at which a sparse depth map SD(t) is inputted to the neural network 1000 are called 'sparse depth map time steps'. The neural network 1000 can also be operated even without receiving sparse depth maps SD(t).

Both data I(x,y,t) and SD(x,y,t) have a 'high resolution': x varies from 1 to $H_{high}$, and y from 1 to $W_{high}$.

The input images I(x,y,t), to be inputted to the neural network 1000 are time-stamped in chronological order over time for different time steps t−1, t, t+1, etc. The input images I may be selected as a subset of a sequence of images acquired by a camera (e.g., sampled every $n^{th}$ frame (where n is a positive integer)). Images I can be images outputted by one camera; they can also be compound images obtained by aggregating images acquired by multiple cameras. Images I can be raw images directly obtained from one or more cameras; as an alternative, a pre-processing may have taken place. The input images may be generated more generally not only from cameras, but from any image capture device. In some instances, the sequence of input images may be generated as synthetic (e.g., computer generated) data. In the present embodiment, the images I have three channels Red, Green and Blue (R,G,B).

The sparse depth maps to be inputted are matrices of dimensions ($H_{high}$, $W_{high}$), having one channel in which depth z(x,y,t) is stored. The depth value represents here the distance in the solid angle corresponding to location (or pixel) (x,y) in the image I(t).

In this embodiment, it is assumed that an image I(x,y,t) and a corresponding sparse depth map SD(x,y,t) are available for each of the successive time steps.

At each time step t, the image I(x,y,t) is inputted to the image convolutional block 110I, while the corresponding sparse depth map SD(x,y,t) is inputted to the sparse depth map convolutional block 110SD.

The image convolutional block 110I applies a 3×3 convolution to the inputted image I, performs additional regularization operations, and transmits the output CI so obtained to the upstream concatenation node 120.

In parallel, the sparse depth map convolutional block 110SD applies a 7×7 convolution to the sparse depth map SD, performs additional regularization operations, and transmits the output CSD so obtained to the upstream concatenation node 120.

The two data structures CI(x,y,t) and CSD(x,y,t) are then concatenated by the upstream concatenation node 90, thus forming a combined scene data structure CD(x,y,t) of dimensions (x,y), having four channels (R,G,B,D), which is transmitted to the encoder 100.

Encoder 100: Down-Sampling

As the down-sampling part of encoder 100, a previously trained Res-Net-34 network is used (Other architectures can also be used for the down-sampling part of encoder 100).

On the basis on the combined scene data CD(x,y,t), at each time step the down-sampling part of encoder 100 outputs an initial image/depth representation X(t). This initial image/depth representation X(t) has a lower resolution than the inputted combined data CD, but more channels than the combined data CD.

The encoder 100 comprises four down-sampling blocks 130, 140, 150 and 160 which progressively prepare the combined data CD(t) received from concatenation node 120 to be transmitted to the ConvLSTM sub-network 200.

Figure 2:
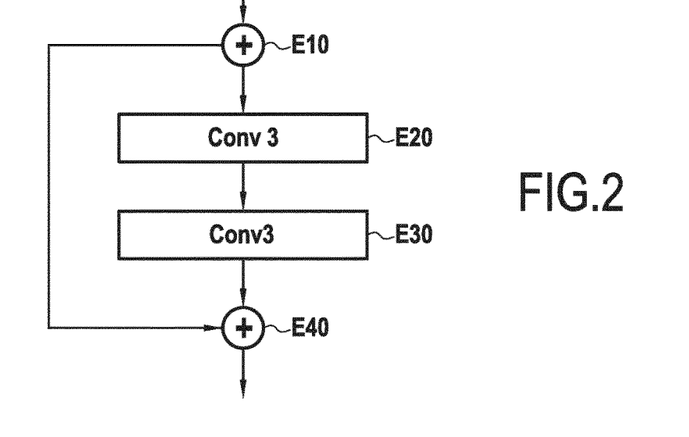
FIG. 2 is a flow diagram of an example process in a block of an encoder layer of the image depth prediction neural network of FIG. 2.

In the present embodiment, each of these down-sampling blocks comprises the following successive layers or functions (FIG. 2):

A splitting node E10, which transmits the inputted data both to a concatenation node E40 and to a convolution block E20;

A convolutional block E20, with receptive fields of 3×3, which applies a convolution to data received from E10 and transmits the output to a convolution block E30;

A convolutional block E30, with receptive fields of 3×3, which applies a convolution to data received from E20 and transmits the output to the concatenation node E40.

The concatenation node E40 concatenates the data received from splitting node E10 and from the convolution layer E30.

The convolutional blocks E20 and/or E30 can be configured to process the inputted data so as to produce a down-sampled output having a lower resolution than the inputted data. That is, the encoder 100 is configured so that down-scaling is performed by some convolutional layers of the encoder.

Consequently, starting from input data CD of resolution ($H_{high}$, $W_{high}$), encoder 100 outputs down-sampled data of resolution ($H_{low}$, $W_{low}$), where $H_{low}$ is much lower than $H_{high}$, and Wow is much lower than $W_{high}$ (for instance, the resolution can be reduced ten-fold in each direction).

The output of the fourth down-sampling block 160 of encoder 100, which is also the output of the encoder 100 and is noted X(x,y,t), constitutes the initial image representation X(t) representing the image I and the sparse depth map SD, at time step t.

The function performed by encoder 100 can thus be represented by the equation:

$$X(t) = f_{encoder}(I(x, y, t) \oplus D(x, y, t))$$

where ⊕ represents the concatenation operation.

Pre-LSTM Concatenation Node 170

Then, the initial image/depth representation X(t) outputted by encoder 100 is concatenated by the pre-LSTM concatenation node 170 with data structures H(x,y,t−1) and C(x,y,t−1), which represent respectively the LSTM variable data (or LSTM hidden state) and the cell state (or internal state) of ConvLSTM network 200 at the previous time step. Both H and C only have one channel. Consequently, this concatenation yields a concatenated data LID (for ISTM Input Data') to be inputted to the ConvLSTM network 200, which has a resolution ($H_{low}$,$W_{low}$). The input data LID is thus obtained by the operation:

$$LID(x, y, t) = X(x, y, z, t) \oplus H(x, y, t-1) \oplus C(x, y, t-1)$$

Taking into account data structures H(t−1) and C(t−1) at the previous time steps t−1 makes it possible to use the information of previous time steps about the scene.

ConvLSTM Sub-Network 200

The concatenated information LID(x,y,t) obtained by the above-mentioned concatenation node 170 is inputted in Conv-LSTM 200. The ConvLSTM sub-network 200 then processes the LID(x,y,t) data so as to output a first dense depth map prediction: the raw dense depth map D(x,y,t).

The ConvLSTM sub-network 200 comprises a convolutional block 210 which is similar to the ConvLSTM network of publication [14], and an additional convolutional block 220 comprising a convolutional layer with receptive fields of 3×3, and a Batch Normalization layer: The output of block 210 is processed by the convolutional block 220 before being outputted to the splitting node 250.

Since the LSTM convolutional block 210 is of the type proposed by publication [14], the key functions performed by this block are defined by the equations below:

$$it = \sigma(Wxi * Xt + Whi * Ht - 1 + Wci \circ Ct - 1 + bi) \quad (4)$$
$$ft = \sigma(Wxf * Xt + Whf * Ht - 1 + Wcf \circ Ct - 1 + bf)$$
$$Ct = ft \circ Ct - 1 + it \circ \tanh(Wxc * Xt + Whc * Ht - 1 + bc)$$
$$ot = \sigma(Wxo * Xt + Who * Ht - 1 + Wco \circ Ct + bo)$$
$$ht = ot \circ \tanh(Ct)$$

where
Ct <represents> cell state at time t
Ht hidden state (forming 'feature map') at time t
it input gate at time t
ft forget gate at time t
of output gate at time t
$W_{xi}$,$Wh_i$,$W_{xf}$,$Wh_f$,$W_{cf}$ Input weights (each ∈ $R_{Nlow \times Mlow}$)
\* the convolution operator
∘ the Hadamard product
σ the sigmoïd function The ConvLSTM sub-network 200 outputs, for the current time step t, the cell state data C(t) and the LSTM hidden variable data H(t).

The LSTM hidden variable Data H(x,y,t) constitutes a summarized representation of the depth information.

The function performed by the Conv-LSTM NN 200 can thus be represented by the equation:

$$H(t), C(t) =$$
$$f_{Conv-LSTM}(LID(x, y, t)) = f_{Conv-LSTM}((X(x, y, t) \oplus H(t-1)), C(t-1))$$

The output data H(t) has the same resolution ($H_{low}$, $W_{low}$) as the input data LID(t).

Post-LSTM Splitting Node 250

Then, the LSTM Hidden Variable Data H(x,y,t) and the LSTM cell state data C(x,y,t) calculated by the ConvLSTM 200 for time step t are sent by splitting node 250 to other systems or processes which use such information, and the LSTM Hidden Variable Data H(x,y,t) is sent to the decoder 300.

Decoder 300

On the basis of the LSTM Hidden Variable Data H(x,y,t) transmitted by the post-LSTM splitting node 250, the decoder 300 first up-samples the data and produces a raw dense depth map D; this raw dense depth map D is then processed by the (optional) output convolutional block 350, which outputs the 'full' dense depth map D'(x,y,t), which has a high-resolution and lastly, the (also optional) bilinear interpolation block 360 inputs the full dense depth map D'(x,y,t) and outputs the final dense depth-map D"(x,y,t) for instant t.

The up-sampling blocks of decoder 300 consist of four stacked up-projection blocks 310, 320, 330 and 340. Each of these blocks expands the spatial resolution of feature maps. Every up-projection block comprises, upstream, an 2×2 up-sampling block.

The output convolutional block 350 is configured to perform a 3×3 convolution.

The bilinear interpolation block 360 is configured to perform bilinear interpolation so as to adapt the resolution of the outputted depth map.

Figure 3:
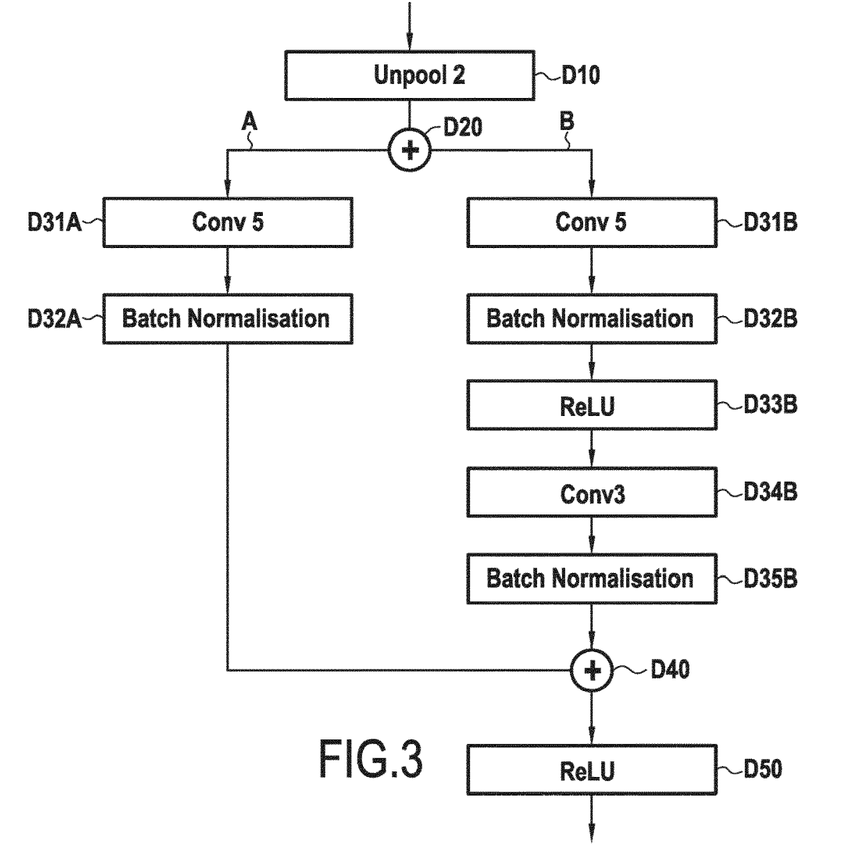
FIG. 3 is a flow diagram of an example process in a block of an decoder layer of the image depth prediction neural network of FIG. 2.

The structure and the functions of each of the up-sampling blocks 310, 320, 330 and 340 are illustrated in more details by FIG. 3.

As shown by this figure, each of these up-sampling blocks is configured to perform the following operations:
a) Unpool the processed data using an up-sampling layer D10, so as to increase the spatial resolution of the processed data;
b) at a splitting node D20, feed-forward the unpooled data to a first path A and a second path B;
c) In the first path A:
  process the unpooled data using a first convolutional layer D31A performing a 5×5 convolution;
  perform Batch Normalisation using a first Batch Normalisation layer D32A;
In the second path B:
  process the unpooled data using a second convolutional layer D31B performing a 5×5 convolution;
  perform Batch Normalisation using a second Batch Normalisation layer D32B;
  perform ReLU activation using a first ReLU layer D33B;
  process the data using a third convolutional layer D34B performing a 3×3 convolution;
  perform Batch Normalisation using a third BN layer D35B;
d) Concatenate the data outputted by the first Batch Normalisation layer (D32A) and the third Batch Normalization layer (D35B), at a concatenation node D40;
e) Perform ReLU activation using a second ReLU layer (D50).

The output of the fourth up-sampling block 340 of decoder 300, which is also the output of the decoder 300, constitutes the raw dense depth map D, which will be used to calculate the predicted depth map D".

To obtain the predicted depth map D", the raw dense depth map D is processed by two final blocks: the convolutional block 350 and the bilinear interpolation block 360.

Convolutional Block 350

This layer performs convolutional operation on the raw dense map D outputted by decoder 300, to yield the full dense map D'.

Bilinear Interpolation Block 360

This layer performs a bilinear interpolation on the full dense map D' outputted by the convolutional block 350, in order to adapt the resolution of the dense depth map to the desired resolution needed for the further processing of the depth map.

The bilinear interpolation block thus outputs the desired dense depth map D", which comprises advantageously estimated depths at instant t for all locations (x,y).

Training

The neural network 1000 is trained with a training dataset. This dataset includes:
  as input:
    a sequence of images I(t), and for each of these images, a corresponding sparse depth map SD(t) for which the dense depth map (GTD(t)) is known; and
  as output:
    a sequence of dense depth maps GTD(t); these dense depth maps corresponding respectively to the images I and corresponding sparse depth maps SD of the input; each dense depth map being the output expected from the neural network (or "ground truth") for the corresponding image and sparse depth map of the input.

The dense depth maps GTD(t) used as ground truth do not have to be 'full' depth maps, comprising valid depth values for all positions (x,y) of the map. A depth map simply comprising more (but preferably: many more) depth values than the sparse depth map can be used.

For instance, sparse depth maps SD(t) could be measurements by a low-resolution LiDAR sensor, having for instance four line scanners, while ground truth dense depth maps GTD(t) could be measurements obtained using a high-resolution LiDAR sensor, having for instance sixty four line scanners.

The training dataset can be made of a large number of images representing real-world scenes complemented by sparse depth maps and dense depth maps.

However, in some cases, the training dataset can include synthetic (e.g., computer generated) data that include images of a synthetic 3D-environment, and corresponding sparse depth maps and dense depths maps, all (or part of all) having been produced by a computer algorithm.

In all cases, the training dataset should contain series of images and depth maps successively acquired by an observer (one observer) at successive time steps.

Training can be performed using offline and/or online data.

Advantageously, the network of the present disclosure can be trained by end-to-end learning.

To obtain the sparse depth maps SD, a possibility consists in sampling dense depth maps (used as ground truth depth maps GTD(t)). The sparse depth map obtained in this manner is therefore similar to a depth map obtained via either a LiDAR sensor or another low-resolution 3D-scanner.

Supervised Training

Supervised training can be performed using loss functions such as an L1 loss function (Least Absolute Deviations) or a L2 Loss function (Least Square Errors).

The Reverse Huber, or 'berHu' loss function can also be used, and gives slightly better results than the L1 and L2 loss functions.

The berHu loss function is described by document [9].

Training the neural network 1000 with such loss function requires however having dense depth maps of the scene, which is not always possible.

For this reason, a semi-supervised learning method is further proposed.

Semi-Supervised Training

In order to perform unsupervised training, the network 1000 is trained using a "learning from video" approach. In this method, a view synthesis loss function is used, which function is formulated as follows.

Notations:
c(t−1) homogeneous coordinates of a pixel in view t−1
K camera intrinsic matrix
$\phi_{t \to t-1}$ relative camera pose from view t to view t−1.
The projected coordinates of c(t) onto view t−1 is:

$$c(t-1) \approx K\phi_{t \to t-1} GTD(t)(ct)K^{-1}c(t)$$

The view synthesis loss term of the loss function is then calculated as $$L_{vs} = \sum_t \sum_c \left\| I_t(c) - I_{t-1}(K\phi_{t \to t-1}D'(t)(ct)K^{-1}c) \right\|$$

where
t is the index of images,
c is the index of pixel locations (or co-ordinates), and
$I_{t-1}$ is the image at time t−1 warped to the coordinate of frame t according to the equation above.

Based on this loss term $L_{vs}$, a semi-supervised learning can be performed on neural network 1000, using a loss function combining the above-defined berHu loss term and view synthesis loss term:

$$L = L_{berHu} + \lambda L_{vs}$$

λ is a trade-off parameter to balance the two terms.

Exemplary Computerized System

Figure 4:
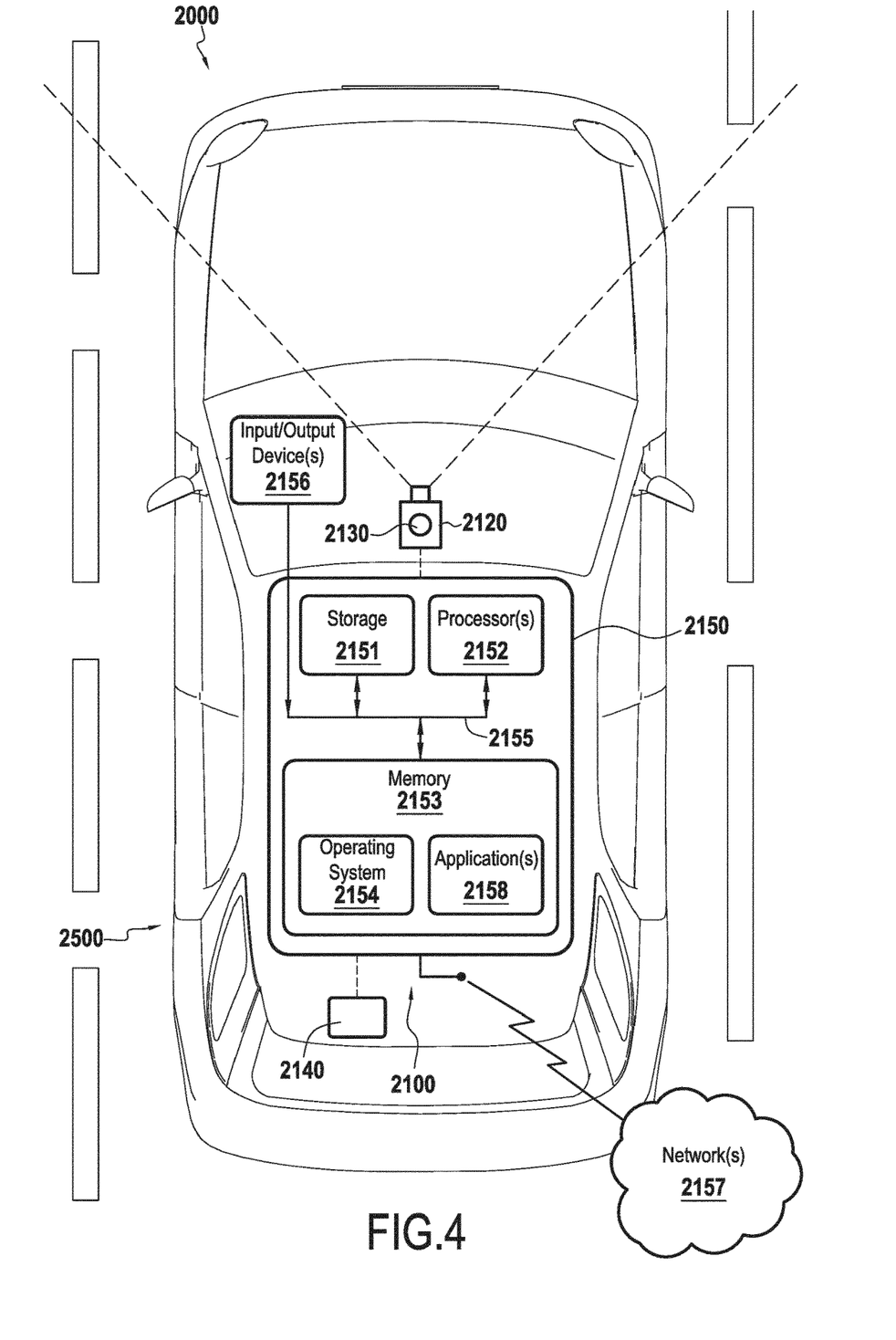
FIG. 4 depicts an example block diagram for a computer system implementing the techniques described herein.

FIG. 4 shows a car 2000 (an example of a vehicle) equipped with an automated driving system 2500. The automated driving system 2500 comprises a dense depth maps prediction system 2100 as an exemplary computerized system on which the present disclosure may be implemented in whole or in part.

The dense depth maps prediction system 2100 (or, in short, the system 2100) comprises several sensor units. These sensor units comprise in particular a forward-facing camera 2120, a lidar 2130 and an Inertial Measurement Unit (IMU) 2140. Camera 2120 and lidar 2130 are both mounted slightly above the windshield of the car on a non-shown mount.

The dense depth maps prediction system 2100 includes a computer system 2150 which comprises a storage 2151, one or more processor(s) 2152, a non-transitory memory 2153, an operating system 2154 and a communication infrastructure 2155.

The communication infrastructure 2155 is a data bus to which all the above-mentioned sensor units are connected, and therefore through which the signals outputted by these sensor units are transmitted to the other components of system 2100.

The storage 2151, the processor(s) 2152, the memory 2153, and the operating system 2154 are communicatively coupled over the communication infrastructure 2155. Optionally, the computer system 2150 may interact with a user, or environment, via input/output device(s) 2156, as well as over one or more networks 2157. The operating system 2154 may interact with other components to control one or more applications 2158. All components of the dense depth maps acquisition system 2100 are shared or possibly shared with other units of the automated driving system 2500 or of car 2000.

A computer program to predict dense depth maps according to the present disclosure is stored in memory 2153. This program, and the memory 2153, are examples respectively of a computer program and a computer-readable recording medium pursuant to the present disclosure.

The memory 2153 of the computer system 2150 indeed constitutes a recording medium according to the invention, readable by the one or more processor(s) 2152 and on which said program is recorded.

The systems and methods described herein can be implemented in software or hardware or any combination thereof. The systems and methods described herein can be implemented using one or more computing devices which may or may not be physically or logically separate from each other.

The systems and methods described herein may be implemented using a combination of any of hardware, firmware and/or software. The present systems and methods described herein (or any part(s) or function(s) thereof) may be implemented using hardware, software, firmware, or a combination thereof and may be implemented in one or more computer systems or other processing systems.

In one or more embodiments, the present embodiments are embodied in machine-executable instructions. The instructions can be used to cause a processing device, for example a general-purpose or special-purpose processor, which is programmed with the instructions, to perform the steps of the present disclosure. Alternatively, the steps of the present disclosure can be performed by specific hardware components that contain hardwired logic for performing the steps, or by any combination of programmed computer components and custom hardware components. For example, the present disclosure can be provided as a computer program product, as outlined above. In this environment, the embodiments can include a machine-readable medium having instructions stored on it. The instructions can be used to program any processor or processors (or other electronic devices) to perform a process or method according to the present exemplary embodiments. In addition, the present disclosure can also be downloaded and stored on a computer program product. Here, the program can be transferred from a remote computer (e.g., a server) to a requesting computer (e.g., a client) by way of data signals embodied in a carrier wave or other propagation medium via a communication link (e.g., a modem or network connection) and ultimately such signals may be stored on the computer systems for subsequent execution.

The methods can be implemented in a computer program product accessible from a computer-usable or computer-readable storage medium that provides program code for use by or in connection with a computer or any instruction execution system. A computer-usable or computer-readable storage medium can be any apparatus that can contain or store the program for use by or in connection with the computer or instruction execution system, apparatus, or device.

A data processing system suitable for storing and/or executing the corresponding program code can include at least one processor coupled directly or indirectly to computerized data storage devices such as memory elements.

The systems and methods described herein can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network.

The term "computer storage medium" may be used to generally refer to a medium such as but not limited to removable storage drive, a hard disk installed in hard disk drive. This computer program product may provide software to computer system. The systems and methods described herein may be directed to such computer program products.

The invention claimed is:

1. A depth maps prediction system comprising a neural network implemented by one or more computers, wherein
the neural network is configured to sequentially receive images representing a scene at successive time steps;
the neural network comprises an encoder sub-network, a ConvLSTM sub-network and a decoder sub-network connected in series;

the neural network is configured so that at each time step among a plurality of sparse depth map acquisition time steps, successively:
a) the encoder sub-network inputs and processes an image and a sparse depth map of the scene associated with the inputted image, the sparse depth map comprising depth information for a subset of pixels of the inputted image, and outputs an initial image representation whose resolution is less than the resolution of the inputted image;
b) the ConvLSTM sub-network inputs and processes the initial image representation, and values for a previous time step of an internal state and of an LSTM hidden variable data of the ConvLSTM sub-network, and outputs updated values for the time step of the internal state and of the LSTM hidden variable data of the ConvLSTM sub-network;
c) the decoder sub-network inputs the outputted LSTM hidden variable data and generates a predicted dense depth map for the inputted image.

2. The system according to claim 1, wherein the encoder sub-network comprises:
an image convolutional block configured to input the inputted image and to apply a convolution thereto.

3. The system according to claim 1, wherein the encoder sub-network comprises a sparse depth map convolutional block configured to input the sparse depth map and to apply a convolution thereto.

4. The system according to claim 1, wherein said sparse depth map has the same resolution as the inputted image;
at step a), data based on the inputted image and data based on the sparse depth data are concatenated by a node to obtain combined scene data; and
the combined scene data is inputted to a down-sampling convolutional block of the encoder sub-network, configured to reduce the resolution of data processed by the encoder sub-network.

5. The system according to claim 1, wherein the neural network has an architecture of a UNet.

6. The system according to claim 1, wherein the encoder sub-network includes a convolutional neural sub-network or a ResNet, in particular a ResNet.

7. The system according to claim 1, wherein the decoder sub-network comprises:
at least one up-sampling convolutional block, connected in series, and configured to input the LSTM hidden variable data and to yield a raw dense depth map; and
a convolutional block-configured to input the raw dense depth map and to apply a convolution thereto to yield a full dense depth map.

8. The system according to claim 7, wherein the decoder sub-network comprises an interpolation block configured to input the full dense depth map and to apply a bilinear interpolation thereto to yield the predicted dense depth map.

9. The system according to claim 7, wherein the encoder sub-network comprises at least one down-sampling convolutional block, connected in series, and configured to reduce the resolution of data processed by the encoder sub-network; and
the neural network comprises skip connections, established between outputs of said at least one down-sampling convolutional block of the encoder and inputs of said at least one up-sampling convolutional block of the decoder.

10. The system according to claim 1, wherein the ConvLSTM sub-network is configured to input inputs, to output outputs and to have hidden states, said inputs, outputs and hidden states all being 3D tensors having two dimensions which are spatial dimensions.

11. One or more non-transitory computer storage medium encoded with instructions that, when executed by one or more computers, cause the one or more computers to implement the system of claim 1.

12. A method for training a neural network of a depth maps prediction system according to claim 1, wherein the neural network is configured to be trained by end-to-end training, based on a training data set;
the training data set comprising, for a plurality of training time steps:
an image;
a sparse depth map; and
a dense depth map;
the dense depth maps constituting the ground truth information.

13. The training method according to claim 12, comprising training the neural network using a loss function comprising at least one term in a list comprising an L1 function, an L2 function, a berHu function, and a synthesis view function, wherein the berHu function is a function of differences, where a sparse depth data point is available, between the value of the sparse depth data point and the value of the estimated depth at the same location in the image; and
the synthesis view function is a function of differences between values of an image captured at a time step and values of a calculated image for the same time step, wherein the calculated image is calculated by applying an estimated relative camera pose
between a previous time step and the time step to an image captured at the previous time step.

14. One or more non-transitory computer storage medium encoded with instructions that, when executed by one or more computers, cause the one or more computers to perform the operations of a method according to claim 12.

15. One or more non-transitory computer storage medium encoded with instructions that, when executed by one or more computers, cause the one or more computers to perform the operations of a method according to claim 13.

* * * * *